United States Patent [19]

Hornbeck

[11] Patent Number: 4,566,935
[45] Date of Patent: Jan. 28, 1986

[54] SPATIAL LIGHT MODULATOR AND METHOD

[75] Inventor: Larry J. Hornbeck, Van Alstyne, Tex.

[73] Assignee: Texas Instruments Incorporated, Dallas, Tex.

[21] Appl. No.: 635,967

[22] Filed: Jul. 31, 1984

[51] Int. Cl.⁴ .................. B44C 1/22; C03C 15/00; C03C 25/06; C23F 1/02
[52] U.S. Cl. .................. 156/626; 29/569 L; 156/643; 156/644; 156/646; 156/653; 156/656; 156/657; 156/659.1; 350/356; 350/360
[58] Field of Search ........... 156/626, 643, 644, 646, 156/650, 653, 656, 657, 659.1, 662; 204/192 E; 29/569 L; 350/356, 360; 357/30

[56] References Cited

U.S. PATENT DOCUMENTS 3,893,231  7/1975  Anderson ............... 156/662 X
3,920,495  11/1975 Roberts ................. 156/662 X
4,457,820  7/1984  Bergeron et al. ........ 156/626 X
4,472,239  9/1984  Johnson et al. ......... 156/659.1 X

OTHER PUBLICATIONS

IBM Technical Disclosure Bulletin, vol. 24, No. 12, May 1982, Optical Inspection of Hole Bottoms, D. S. Goodman et al., p. 6280.

*Primary Examiner*—William A. Powell
*Attorney, Agent, or Firm*—Carlton H. Hoel; Robert O. Groover; James T. Comfort

[57] ABSTRACT

Methods of fabrication of spatial light modulators with deflectable beams by plasma etching after dicing of a substrate into chips, each of the chips an SLM, is disclosed. Also, various architectures available with such plasma etching process are disclosed and include metal cloverleafs for substrate addressing, metal flaps formed in a reflecting layer over a photoresist spacer layer, and torsion hinged flaps in a reflecting layer.

6 Claims, 40 Drawing Figures

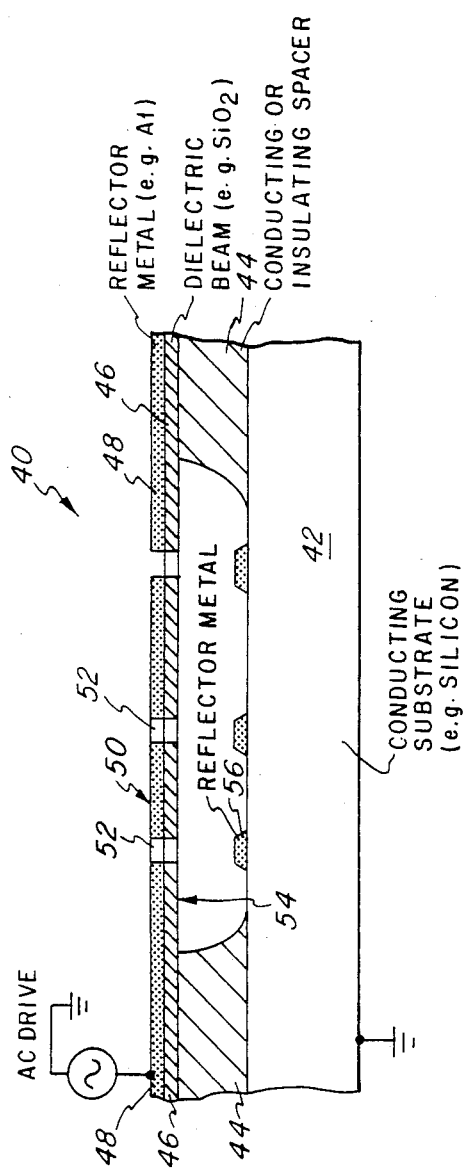
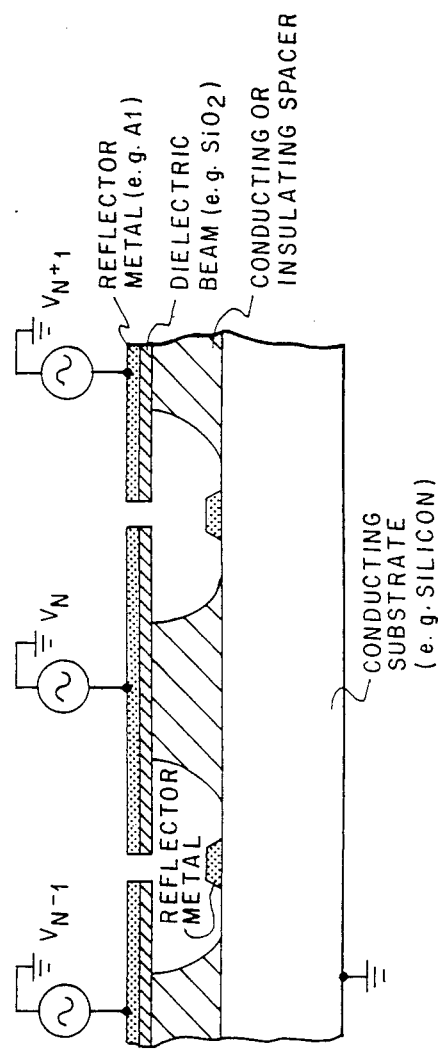

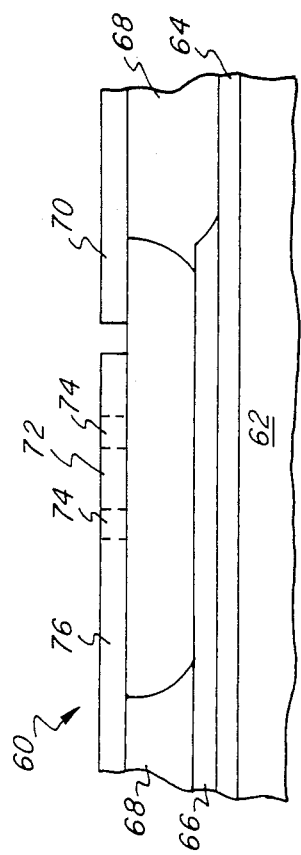
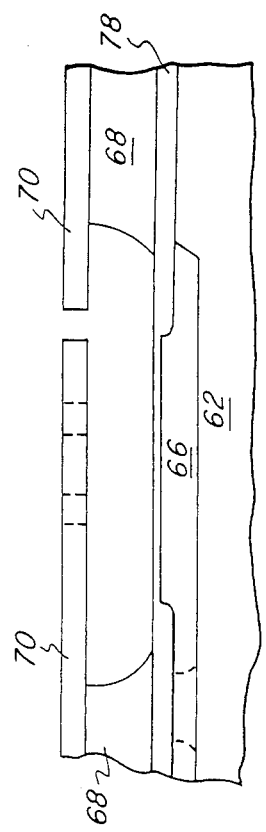
Fig. 10A
Fig. 10B

SPATIAL LIGHT MODULATOR AND METHOD

BACKGROUND OF THE INVENTION

The present invention relates to spatial light modulators (light valves), and, more particularly, to spatial light modulators with deflectable beams electronically addressed.

Spatial light modulators (SLM) are transducers that modulate incident light in a spatial pattern corresponding to an electrical or optical input. The incident light may be modulated in its phase, intensity, polarization, or direction, and the light modulation may achieved by a variety of materials exhibiting various electrooptic or magnetooptic effects and by materials that modulate light by surface deformation. SLMs have found numerous applications in the areas of optical information processing, projection displays, and electrostatic printing. See references cited in L. Hornbeck, 128×128 Deformable Mirror Device, 30 IEEE Trans.Elec.Dev. 539 (1983).

A well known SLM used for large bright electronic displays is the Eidophor, a system which uses an electrostatically dimpled oil film as the active optical element. See, E. Baumann, The Fischer large-screen projection system (Eidophor), 20 J. SMPTE 351 (1953). In this system a continuous oil film is scanned in raster fashion with an electron beam that is modulated so as to create a spatially periodic distribution of deposited charge within each resolvable pixel area on the oil film. This charge distribution results in the creation of a phase grating within each pixel by virtue of the electrostatic attraction between the oil film surface and the supporting substrate, which is maintained at constant potential. This attractive force causes the surface of the film to deform by an amount proportional to the quantity of deposited charge. The modulated oil film is illuminated with spatially coherent light from a xenon arc lamp. Light incident to modulated pixels on the oil film is diffracted by the local phase gratings into a discrete set of regularly spaced orders which are made to fall on a schlieren stop consisting of a periodic array of alternating clear and opaque bars by part of the optical system. The spacing of the schlieren stop bars is chosen to match the spacing of the diffracted signal orders at the stop plane so that high optical throughput efficiency is achieved. Light that is incident to unmodulated regions of the light valve is blocked from reaching the projection lens by the opaque bars of the schlieren stop. Images formed of unmodulated areas on the light valve by the schlieren imaging system on the projection screen are therefore dark, while the phase perturbations introduced by the modulated electron beam are converted into bright spots of light at the screen by the schlieren projector. In spite of numerous technical difficulties associated with oil polymerization by electron bombardment and organic vapor contamination of the cathode, this type of oil-film system has been successfully developed to the point that it is the almost universally used system for a total light requirement of thousands of lumens at the screen. However, such systems are expensive, bulky, and have short-lived components.

A number of non-oil-film SLMs have also been developed and include deflectable element types, rotation of plane of polarization types, and light scattering types. These SLM types employ various effects such as deformation of reflective layers of metal, elastomer, or elastomer-photoconductor, and polarization and scattering of ferroelectrics, PLZT ceramics, and liquid crystals. For example, R. Sprague et al, Linear total internal reflection spatial light modulator for laser printing, 299 Proc. SPIE 68 (1981) and W. Turner and R. Sprague, Integrated total internal reflection (TIR) spatial light modulator for laser printing, 299 Proc. SPIE 76 (1982) and U.S. Pat. No. 4,380,373 describe a system for non-impact printing on a photosensitive medium in which laser light is formed into a line of illumination and passed through a linear array of light modulators and then imaged onto the photosensitive medium. The array is implemented as a total internal reflection spatial light modulator with the electrodes and drive electronics fabricated on an integrated drive element which is placed against the total reflection surface of an electrooptic crystal such as lithium niobate. The localized change in index of refraction produced by the fringing field between each two electrodes is read out with schlieren readout optics which image the TIR interface onto the photosensitive medium. This is a one dimensional image, and the photosensitive medium is rotated on a drum beneath the image of the linear array to generate the two dimensional image (e.g., a page of text) for printing applications. However, the SLM (light valve) is highly susceptible to fabrication problems due to its hybrid nature. The fringing field strength, and hence the amount of light diffracted from modulated pixels, is sensitive to changes in the air gap thickness between the address electrodes and the electrooptic crystal surface of less than one tenth micron. Thus, even very small particles trapped between the crystal and electrode structure could cause illumination nonuniformity problems at the photosensitive medium. The system optical response for pixels located at the boundary between modulated and unmodulated areas of the light valve is also significantly lower than the response for pixels near the middle of a modulated region due to the nature of the addressing technique. A commercially available printer based on this technology has not been introduced to date.

M. Little et al., CCD-Addressed Liquid Crystal Light Valve, Proc. SID Symp. 250 (April 1982) describes a SLM with a CCD area array on the front side of a silicon chip and a liquid crystal array on the backside of the chip. Charge is input into the CCD until a complete frame of analog charge data has been loaded; the charge is then dumped to the backside of the chip where it modulates the liquid crystal. This device suffers from severe fixed pattern noise as well as resolution degradation due to the charge spreading from the front-to-back transfer.

Another SLM type which may be fabricated in both one and two dimensional arrays is the deformable mirror. Deformable mirrors may be subdivided into three classes: elastomers, membranes, and cantilever beams. In the elastomer approach a metallized elastomer is addressed by a spatially varying voltage that produces surface deformation through compression of the elastomer. Because of the address voltage requirements in the order of one or two hundred volts, the elastomer is not a good candidate for integration with a high-density silicon address circuit. See, generally, A. Lakatos and R. Bergen, TV projection display using an amorphorous-Se-type RUTICON light valve, 24 IEEE Trans. Elec.Dev.930 (1977).

Membrane deformable mirrors come in a variety of types. One type is essentially a substitute for the oil film of the Eidophor system discussed above. In this system a thin reflective membrane is mounted to the faceplate of a cathode ray tube (CRT) by means of a support grid structure. Addressing is by a raster scanned electron beam as with the Eidophor. The charge deposited on the glass faceplate of the CRT by the electron beam electrostatically attracts the membrane which is held at a constant voltage. This attractive force causes the membrane to sag into the well formed by the grid structure, thereby forming a miniature spherical mirror at each modulated pixel location. The light diffracted from this type of modulated pixel is concentrated into a relatively narrow cone that is rotationally symmetric about the specularly reflected beam. This type of light valve is thus used with a schlieren stop that consists of a single central obscuration positioned and sized so as to block the image of the light source that is formed by the optical system after specular reflection from unmodulated areas of the light valve. Modulated pixels give rise to a circular patch of light at the schlieren stop plane that is larger than the central obscuration, but centered on it. The stop efficiency, or fraction of the modulated pixel energy that clears the schlieren stop, is generally somewhat lower for projectors based on deformable membranes than it is for the oil film Eidophor projector. Further, such membrane deformable mirror systems have at least two major problems. High voltages are required for addressing the relatively stiff reflective membrane, and slight misalignments between the electron beam raster and the pixel support grid structure lead to addressing problems. Such misalignments would cause image blurring and nonuniformity in display brightness.

Another type of membrane deformable mirror is described in L. Hornbeck, 30 IEEE Tran.Elec.Dev.539 (1983) and U.S. Pat. No. 4,441,791 and is a hybrid integrated circuit consisting of an array of metallized polymer mirrors bonded to a silicon address circuit. The underlying analog address circuit, which is separated by an air gap from the mirror elements, causes the array of mirrors to be displaced in selected pixels by electrostatic attraction. The resultant two-dimensional displacement pattern yields a corresponding phase modulation pattern for reflected light. This pattern may be converted into analog intensity variations by schlieren projection techniques or used as the input transducer for an optical information processor. However, the membrane deformable mirror has manufacturability problems due to the susceptibility to defects that result when even small, micron sized particles are trapped between the membrane and the underlying support structure. The membrane would form a tent over these trapped particles, and the lateral extent of such tents is much larger than the size of the particle itself, and these tents would in turn be imaged as bright spots by a schlieren imaging system.

A cantilever beam deformable mirror is a micromechanical array of deformable cantilever beams which can be electrostatically and individually deformed by some address means to modulate incident light in a linear or areal pattern. Used in conjunction with the proper projection optics, a cantilever beam deformable mirror can be employed for displays, optical information processing, and electrophotographic printing. An early version with metal cantilever beams fabricated on glass by vacuum evaporation appears in U.S. Pat. No. 3,600,798. This device has fabrication problems which include the alignment of the front and back glass substrates arising from the device's nonintegrated architecture.

A cantilever beam deformable mirror device is described in R. Thomas et al, The Mirror-Matrix Tube: A Novel Light Valve for Projection Displays, 22 IEEE Tran.Elec.Dev. 765 (1975) and U.S. Pat. Nos. 3,886,310 and 3,896,338. This device is fabricated as follows: a thermal silicon dioxide layer is grown on a silicon on sapphire substrate; the oxide is patterned in a cloverleaf array of four cantilever beams joined in the middle. The silicon is isotropically wet etched until the oxide is undercut, leaving within each pixel four oxide cantilever beams supported by a central silicon support post. The cloverleaf array is then metallized with aluminum for reflectivity. The aluminum which is deposited on the sapphire substrate forms a reference grid electrode which is held at a DC bias. The device is addressed by a scanning electron beam which deposits a charge pattern on the cloverleaf beams causing the beams to be deformed by electrostatic attraction towards the reference grid. Erasure is achieved by negatively biasing a closely spaced external grid and flooding the device with low-energy electrons. A schlieren projector is used to convert the beam deformation into brightness variations at the projection screen. A significant feature of this device is the cloverleaf geometry which leads to beam deflection in a direction rotated forty-five degrees from the openings between the beams; this permits use of a simple cross shaped schlieren stop to block out the fixed diffraction background signal without attenuating the modulated diffraction signal. The device was fabricated with a pixel density of five hundred pixels per inch with beams deflectable up to four degrees. The optics employed a 150 watt xenon arc lamp, reflective schlieren optics and a 2.5 by 3.5 foot screen with a gain of five. Four hundred TV lines of resolution were demonstrated with a screen brightness of thirty-five footlumens, a contrast ratio of fifteen to one, and a beam diffraction efficiency of forty-eight percent. Write times of less than 1/30 second were achieved and erase times were as short as 1/10 of the write time. However, the device has problems, including degradation of resolution from scanning errors, poor manufacturing yield, and no advantage over conventional projection cathode ray tubes. That is, the scan-to-scan positioning accuracy is not high enough to reproducibly write on individual pixels. The resulting loss of resolution forces at least a four fold increase in the number of pixels required to maintain the same resolution compared to comparably written phosphor. Also, the device yield is limited by the lack of an etch stop for the cloverleaf support post, the wet etching of the beams leading to beam breakage, and the need to evaporate normally tensile aluminum in a state of zero stress on the oxide beams. Further, the device offers no apparent cost or performance advantage over conventional projection CRTs.

Cantilever beams deformable mirrors integrated on silicon with addressing circuitry, thus eliminating the electron beam addressing with its high voltage circuitry and vacuum envelopes of the previously described cantilever device, appear in K. Petersen, Micromechanical light modulator array fabricated on silicon, 31 Appl.-Phys.Lett. 521 (1977) and U.S. Pat. No. 4,229,732. The first of these references describes a 16 by 1 array of diving board-shaped cantilever beams fabricated as follows: an epitaxial layer of <100>-oriented silicon (either p or n) of thickness of about 12 microns is grown on a p+ substrate (or buried layer); the epilayer is oxidized to a thickness of about 0.5 micron and covered with a Cr-Au film of thickness about 500 Å. The Cr-Au is etched away to form contact pads and address lines and to define the diving board metallization. The oxide is etched away in a comb pattern around the metallization in a second masking step. Finally, the silicon itself is etched in a solution of ethylenediamine and pyrocatechol at 120 degrees C. If the proper orientation of the mask with respect to the crystalline axes is maintained, the metal-coated oxide diving boards will be undercut by the etch and freed from the silicon. Since the etch is anisotropic, further lateral etching will be stopped by the <111> planes defining the rectangular envelope of the comb pattern. In addition, the etchant is inhibited by p+ material, so the depth of the well beneath the diving boards is defined by the thickness of the epilayer. When a dc voltage is applied between the substrate and the diving board metallization, the thin oxide diving board will be electrostatically deflected downward into the etched well. Diving boards of length 106 microns and width 25 microns showed a threshold voltage of about 66 volts.

The second reference (U.S. Pat. No. 4,229,732) describes devices fabricated in a manner similar to the diving board device (a buried p+ layer as an etch stop for forming the wells underneath metallized silicon dioxide cantilever beams) but has a different architecture; namely, the cantilever beams are in the shape of square flaps hinged at one corner, the flaps form a two dimensional array instead of the one dimensional row of diving boards, and the wells underneath the flaps are not connected so that addressing lines for the flaps may be formed on the top surface of the silicon between the rows and columns of flaps. Of course, the corner hinging of the flaps derives from the cloverleaf architecture of U.S. Pat. Nos. 3,886,310 and 3,896,338, but the full cloverleaf architecture could not be used because this would preclude the surface addressing lines since cloverleaf flaps are hinged to a central post isolated from the silicon surface. Further, these devices have problems including poor resolution and low efficiency due to density limitations and the small fractional active area, low manufacturing yield, degradation of contrast ratio due to diffraction effects from the address circuitry, and residual image due to the charging effects of the oxide flap. More particularly, the addressing circuitry is squeezed around the active area (flaps) because no option exists for placing the address circuitry under the active area due to the wells being formed by etching away the epilayer down to the p+ etch stop. Thus the active area is reduced substantially together with the diffraction efficiency. This means more lamp power is required for the same screen brightness. Because the address circuitry requires additional area, the pixel size is increased far beyond the flap area with a resulting decrease in achievable resolution. The wet etching required to form the wells leads to low electrical and mechanical yield; indeed, wet cleanups, such as after dicing into chips, destroy flaps and diving boards because during the spin-rinse/dry cycle the water trapped under the beam breaks the beam as it is spun from the surface. If the water is instead evaporated from the surface it leaves behind surface residues which can increase surface leakage currents contributing to erratic device operation. Also, the addressing circuitry being on the silicon surface is exposed to the incident light to be modulated and creates unwanted diffraction effects from the transistor gate plus lowers the contrast ratio.

In addition, light leakage into the address structure produces photogenerated charge and reduces storage time. Lastly, the oxide/metal flap has the insulating side facing the well and will charge up due to the intense electric fields which exist across the well; this produces a residual ("burn-in") image. The AC drive required to eliminate this residual image problem cannot be supplied by the NMOS drive circuitry described. Further, if the flap is deflected past the maximum stable deflection, then it will collapse and stick to the bottom of the well. Thus, voltages over the collapse voltage must be absolutely avoided.

A variation of the cantilever beam approach appears in K. Petersen, Silicon Torsional Scanning Mirror, 24 IBM J.Res.Devp. 631 (1980) and M. Cadman et al, New Micromechanical Display Using Thin Metallic Films, 4 IEEE Elec.Dev.Lett. 3 (1983). This approach forms metallic flaps which are connected to the surrounding reflective surface at two opposed corners and operate by twisting the flaps along the axes formed by the connections. The flaps are not formed monolithically with the underlying addressing substrate, but are glued to it in a manner analogous to the deformable membrane devices mentioned above.

The cantilever beam references discussed above all suggest the schlieren projection optical systems be used with the cantilever beam devices. But such systems have limitations in terms of attainable optical performance. First, the aperture diameter of the imaging lens must be larger than is necessary to pass the signal energy alone. Hence the speed of the lens must be relatively high (or, equivalently, its f-number must be relatively low) to pass all the signal energy around the central shlieren stop obscuration. In addition, the signal passes through the outer portion of the lens pupil in this imaging configuration. Rays of light emanating from any given point on the SLM and passing through the outermost areas of an imager lens pupil are the most difficult ones to bring to a well-corrected focus during the optical design of any imaging lens. When the outer rays are brought under good control, the rays passing through the center of the imager lens are automatically well-corrected. Hence, a greater level of optical design complexity is required of the imaging lens. Second, the field angle over which the imaging lens can form well-corrected images of off-axis pixels on a cantilever beam SLM is also restricted. Any lens design tasks involves a compromise between the speed of the lens and the field angle it can cover with good image quality. Fast lenses tend to work over small fields, while wide angle lenses tend to be relatively slow. Since the schlieren imager must be well-corrected over its entire aperture, and since this aperture is larger in diameter than is required to pass the image forming light, the field angle that can be covered by the lens is smaller than it could be if a different imaging configuration could be devised in which the signal was passed through the center of an unobscured, smaller diameter lens. Lastly, for an imager lens having a given finite speed, the use of the schlieren stop configuration also limits the size of the light source that can be utilized. This in turn limits the irradiance level that can be delivered to a projection screen or a photoreceptor at the image of a deflected pixel. This irradiance level, or the delivered power per unit area, depends on the product of the radiance of the light source, the transmittance of the optical system, and the solid angle of the cone of image forming rays of light. The source radiance is determined only by the particular lamp that is used. The optics transmittance depends on the stop efficiency for the particular SLM/schlieren stop configuration and surface transmission losses. But the solid angle of the image forming cone of light is directly proportional to the area of the imager lens pupil that is filled with signal energy. THe use of a schlieren stop that obscures the central area of the imager lens pupil limits the usable pupil area and thus the image plane irradiance level that can be obtained for a lens of a given speed and a source of a given radiance; this is in addition to the fundamental irradiance limitation that the maximum usable cone of light has an opening angle equal to the beam deflection angle.

Thus the known cantilever beam SLMs have problems including addressing circuitry limiting the fractional active area of the pixels, processing steps giving low yields, sensitivity to film stress in the beams, beam insulator charging effects, lack of overvoltage protection against beam collapse, performance not compatible with low cost optics design, and low contrast ratio due to non planarized addressing circuitry on the surface.

SUMMARY OF THE INVENTION

The present invention provides methods for fabrication of spatial light modulators (SLM) with deflectable beams and electronic addressing by freeing the beams from a processing spacer as an essentially last step; this solves the known methods problems of beam breakage during processing. A preferred embodiment method frees the beams by a plasma etch of the spacer; this plasma etch can be done after dicing of a substrate into chips, each chip forming an SLM. Another preferred embodiment method also plasma etches the spacer, but only partially so as to permit use of the spacer as a sturctural element of the SLM. These methods allow for SLM architectures incorporating substrate addressing and overcome the diffraction and packing problems of the known methods.

BRIEF DESCRIPTION OF THE DRAWINGS

FIGS. 8A-B are schematic cross sectional elevations of a variation of the pixel of FIG. 1;

FIG. 10A is a schematic cross sectional elevation of a pixel fabricated by a second preferred embodiment method;

FIG. 10B is a schematic cross sectional elevation of a variation of the pixel of FIG. 10A;

DESCRIPTION OF THE PREFERRED EMBODIMENTS

The inventive method relates to fabrication of deflectable beam spatial light modulators (SLM) which are typically formed of linear or area arrays of pixels, each pixel individually addressable, and in the form of monolithic silicon based chips. The chips are fabricated by processing silicon wafers, dicing the wafers into chips, followed by processing of the individual chips. The chips will vary in size depending upon the application; for example, a 2400 by 1 linear array of pixels (which could be a component of a 300 dots per inch printer) may be fabricated on a chip about 1300 mils by 250 mils with pixels about 12 microns square. The following descriptions are primarily of the individual pixels for an SLM and the methods of fabrication, and all of the drawings are schematic for clarity of explanation.

Figure 1A:
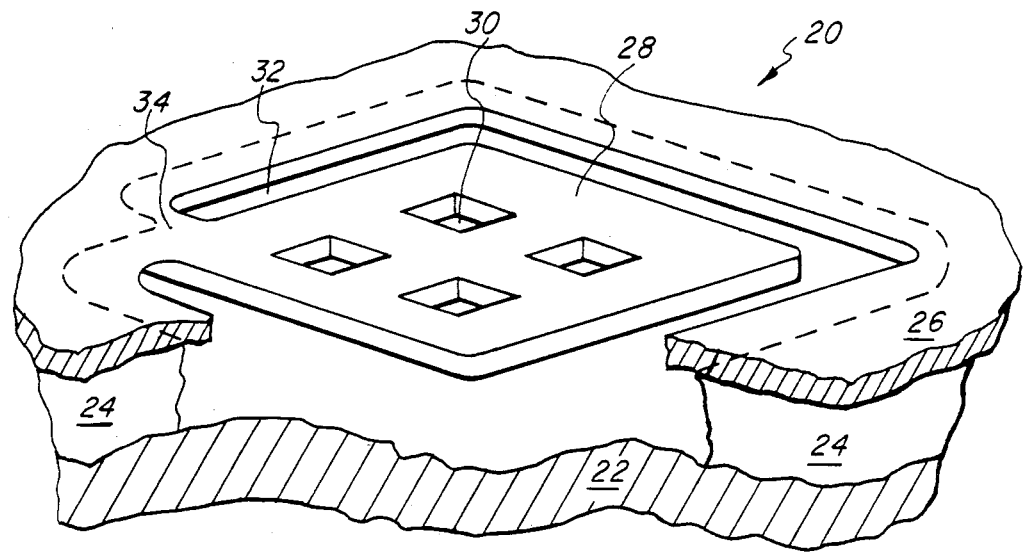
FIGS. 1A-C are schematic perspective, cross sectional elevation, and plan views of a pixel for an SDLM fabriacted by a first preferred embodiment method.
Figure 1B:
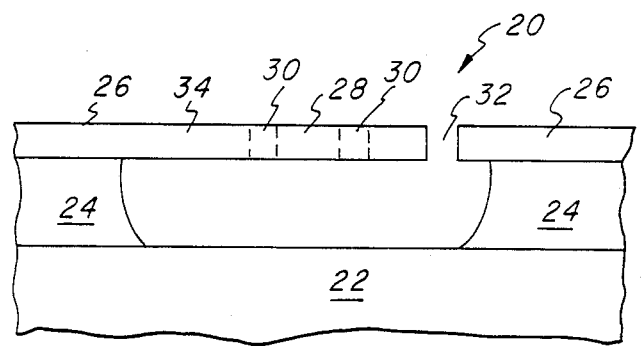
Figure 1C:
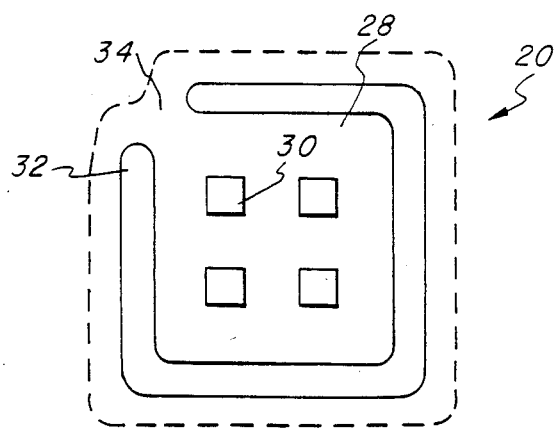

A first preferred embodiment single pixel of a cantilever beam spatial light modulator fabricated by a first preferred embodiment method is shown in schematic perspective view in FIG. 1A, in cross sectional elevation view in FIG. 1B, and in plan view in FIG. 1C. The pixel, generally denoted 20 and basically a flap covering a shallow well, includes substrate 22, spacer 24, reflecting layer 26, and flap 28 formed in layer 26; flap 28 contains plasma etch access holes 30. Typical dimensions for pixel 20 would be as follows: flap 28 is a square with sides 12 to 25 microns long; spacer 24 is 1 to 2.5 microns thick (so the distance from the bottom surface of flap 28 down to substrate 22 is 1 to 2.5 microns); layer 26 is 0.12 micron (1,200 A) thick; holes 30 are 2 microns square; and plasma etch access gap 32 is 2 microns wide.

Substrate 22 is <100> oriented silicon with resistivity 5 to 10 ohms-cm. Spacer 24 is positive photoresist which is an insulator; and layer 26 is aluminum alloyed with 4 percent copper. This alloy has a coefficient of thermal expansion not drastically different from that of spacer 24, and this minimizes the stress between the layers 24 and 26 created by the deposition of layer 24 on layer 26, as described below.

Figure 2:
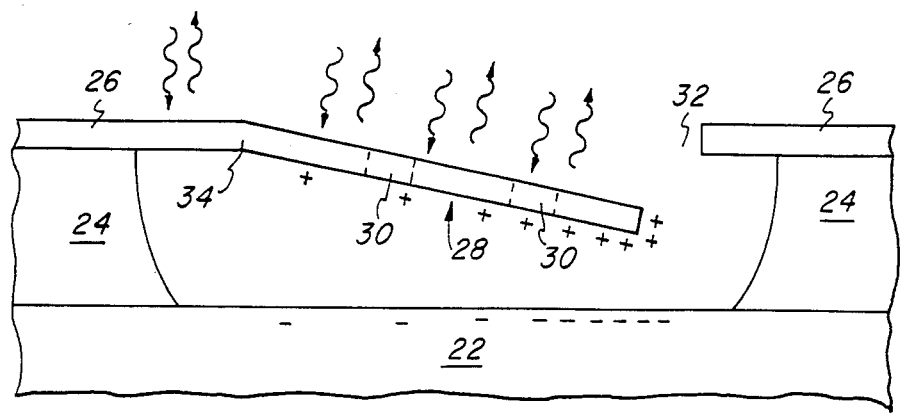
FIG. 2 illustrates operation of the pixel of FIG. 1.
Figure 3:
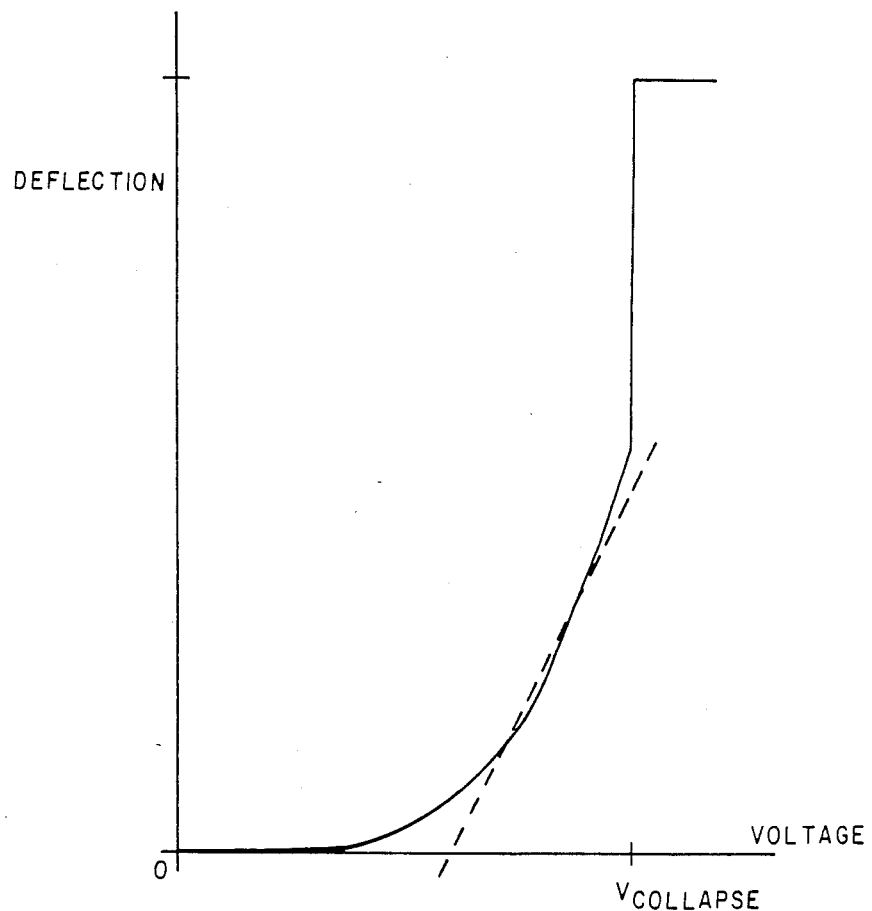
FIG. 3 is a response curve for the pixel of FIG. 1.

Pixel 20 is operated by applying a voltage between layer 26 and substrate 22; flap 28 and the exposed surface of substrate 22 form the two plates of an air gap capacitor and the opposite charges induced on the two plates by the voltage exert electrostatic force attracting flap 28 to substrate 22. This attractive force causes flap 28 to bend at hinge area 34 and be deflected towards substrate 22; FIG. 2 shows an exaggerated view of this deflection together with an indication of the charges concentrated at the regions of smallest gap. For voltages in the range of 20 to 25 volts, the deflection is in the range of 1 to 2 degrees (approximately 0.5 micron vertical movement by the corner of flap 28 farthest from hinge 34 for a 20 micron flap size with 1 degree of deflection). Note that the deflection is a highly nonlinear function of the voltage because the restoring force generated by the bending of hinge 34 is approximately a linear function of the deflection but the electrostatic force of attraction varies roughly as the logarithm of the reciprocal of the distance between the closest corner of flap 28 and substrate 22 (recall that the capacitance increases as the distance decreases so the induced charges both increase in quantity and get closer together). FIG. 3 illustrates the dependence of deflection on voltage; the voltage at which flap 28 becomes unstable and bends all the way to touch substrate 22 is called the collapse voltage. For voltages somewhat less than the collapse voltage the deflection is approximately a linear function of the voltage (see dotted line in FIG. 3) and this is the analog operating region.

Pixel 20 is extremely simple because the application of voltage between flap 28 and substrate 22 (in other words, addressing pixel 20) has been illustrated without regard for the circuitry complexity that arises when the other pixels of the cantilever beam spatial light modulator are considered. Discussion of the circuitry will appear in the other preferred embodiments considered below; but first we turn to the method of fabrication of pixel 20.

The steps for fabrication of pixel 20 are as follows. (1) Start with a <100> oriented silicon substrate of resistivity 5 to 10 ohms-cm (typically the substrate will be in the form of a three inch diameter circular wafer); (2) spin on a layer of positive photoresist which is insoluble in chlorobenzene (for example, novalac resin based resists), if the layer is to be about 2 microns thick, then this spin-on should be done in three stages to avoid surface waves which develop in thick spun on layers, that is, spin on about 0.7 micron of resist, bake, spin on another 0.7 micron of resist, bake again, spin on a last 0.7 micron of resist and bake a final time; (3) sputter deposit a 0.12 micron layer of aluminum alloyed with 4 percent copper at close to room temperature to minimize thermal mismatch and the resulting stress between the metal and resist layers; (4) apply a positive photoresist and photolithographically pattern it to define the plasma etch access holes and gap; (5) plasma etch the exposed aluminum alloy (for example, chlorine-boron trichloride-silicon tetrachloride etch gas can be used) to form the plasma etch access holes and gaps; (6) spin on a layer of PMMA (polymethyl methacrylate) to act as a protective layer during subsequent steps; (7) dice the substrate into chips (each chip will become an SLM); (8) dissolve the PMMA by spraying with chlorobenzene and immediately centrifuge to remove the dicing debris, note that the positive resist does not dissolve in the PMMA developer; (9) isotropically plasma etch the chips to remove the spacer (positive photoresist) from under the flaps and thereby form the wells, this etch also removes the resist layer on the top of the flaps and completes the chip processing. Note that the flap is not exposed directly to dicing debris, either during the dicing operation or during protective PMMA cleanup. A convenient plasma etch in step 9 is based on oxygen; oxygen rapidly etches PMMA and photoresist but neither silicon nor aluminum. This plasma etch must be at low temperature because the spacer will soften at about 120 degrees C.

Figure 4A:
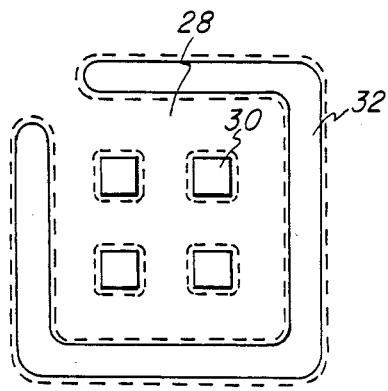
FIGS. 4A-G illustrate the plasma etch step of the first preferred embodiment process for fabricating the pixel of FIG. 1.
Figure 4B:
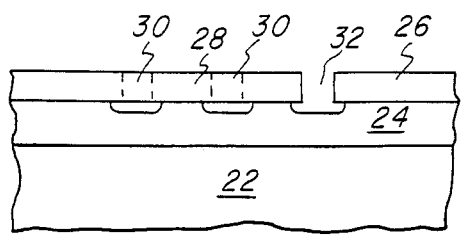
Figure 4C:
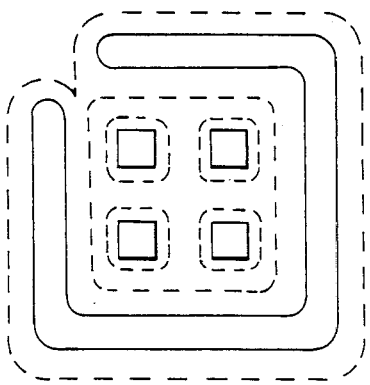
Figure 4D:
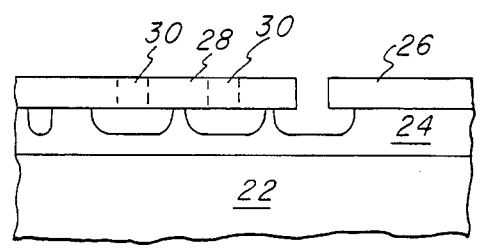
Figure 4E:
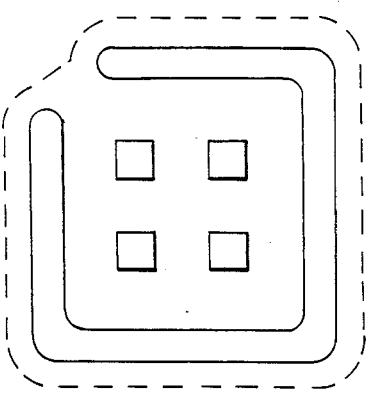
Figure 4F:
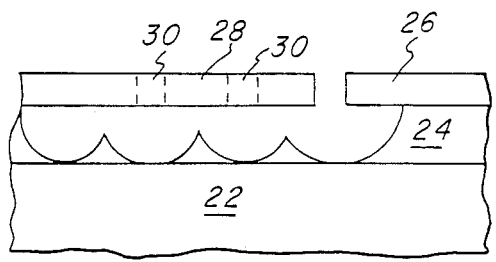
Figure 4G:
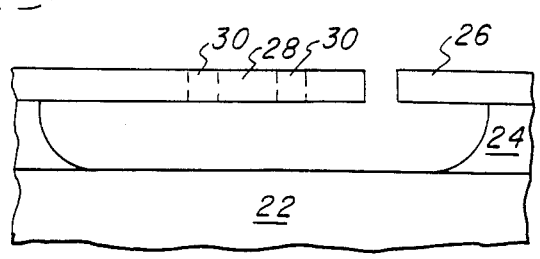

Of course, the plasma etch in step 9 must be monitored or timed because the continued removal of spacer beyond that between the flap and the substrate will eventually remove the support for the reflective layer and encroach on neighboring pixels. And this is the reason for plasma etch access holes in the flap. As illustrated in FIGS. 4A–G, the removal of spacer is not orientation dependent and undercuts layer 26 at the same speed that it undercuts flap 28. FIGS. 4A–B show the early stages of the etch: the left hand portion is a plan view with the horizontal extent of the undercut indicated by dotted lines, and the right hand portion is a cross sectional elevation (the cross section is along the diagonal of the flap running through the hinge) illustrating the effect of the plasma etch access holes 30. FIGS. 4C–F show successive stages, and FIG. 4G the completed etch. Holes 30 are most effective for shallow wells, that is, spacer 24 thin, as is apparent from FIG. 4F.

Figure 5A:
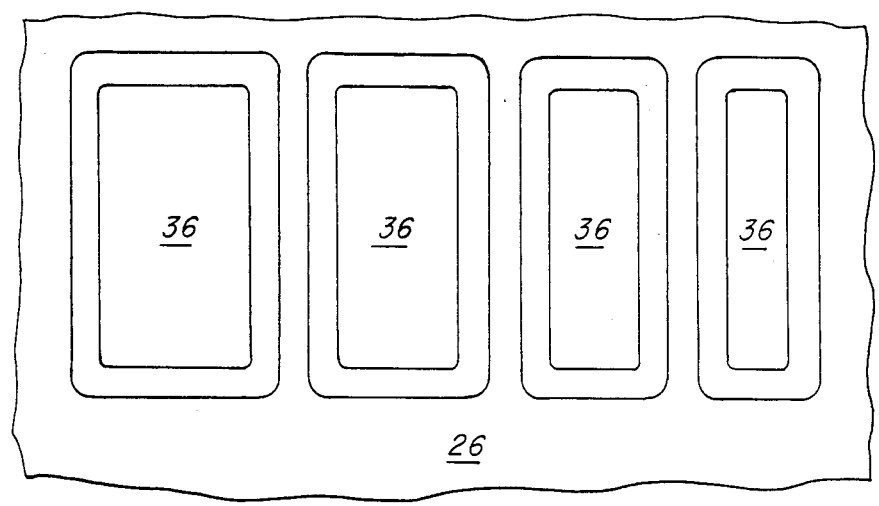
FIGS. 5A-B illustrates the plasma etch extent control dropout beams for the pixel of FIG. 1.
Figure 5B:
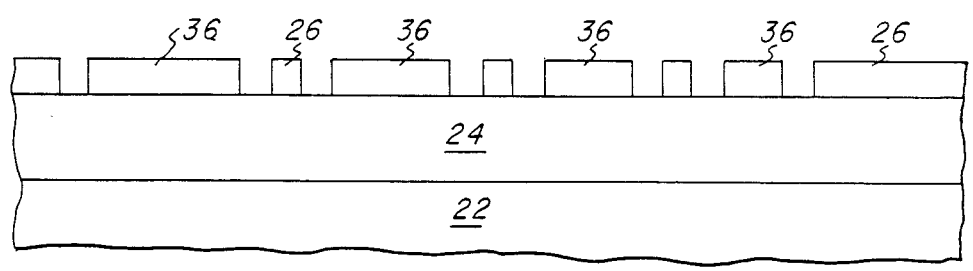
Figure 6A:
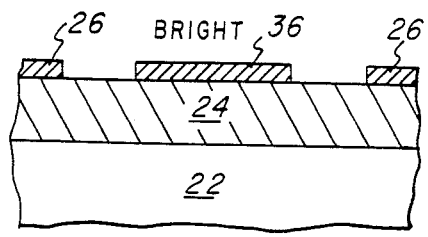
FIGS. 6A-E shows the operation of the dropout beams of FIG. 5.
Figure 6B:
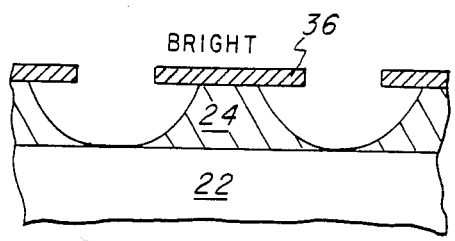
Figure 6C:
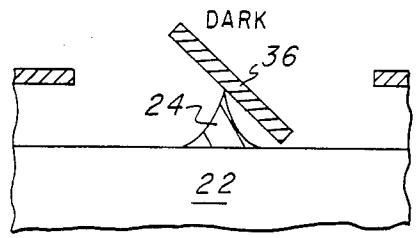
Figure 6D:
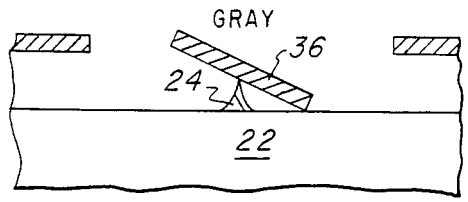
Figure 6E:
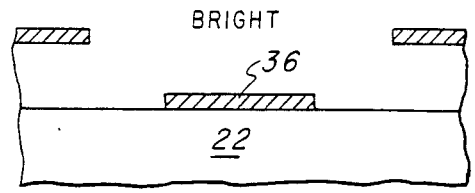
Figure 7A:
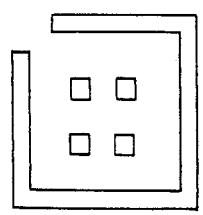
FIGS. 7A-E illustrate various beam geometries for use with the pixels of the FIG. 1.
Figure 7B:
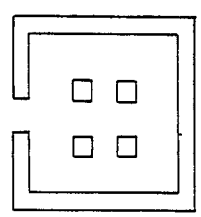
Figure 7C:
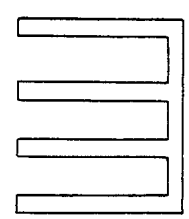
Figure 7D:
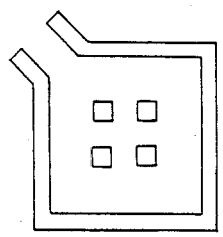
Figure 7E:
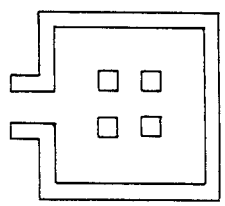

Precise monitoring of plasma etch step 9 can be accomplished as follows. Etch control structures in the corner(s) of the chip are patterned as shown in FIGS. 5A–B, the top portion being a plan view and the bottom portion a cross sectional elevation. The rectangular portions 36 of layer 26 which have been isolated from the remainder of layer 26 are called dropout beams and have a progression of increasing widths. During the plasma etch removal of the spacer, the control corner of the chip is periodically viewed under a brightfield microscope. FIG. 6 shows the sequence of positions assumed by a dropout beam as the plasma etch proceeds. When viewed under a brightfield microscope, dropout beam 36 initially appears bright and continues to appear bright until the plasma etch undercuts from the sides of dropout beam 36 meet. At this time, dropout beam 36 is freed from spacer 24 and tilts by a substantial angle; beam 36 now appears dark. As the plasma etch continues, the cusp of spacer 24 supporting beam 36 is being removed and beam 36 appears to pass through shades of gray until it again is bright. By examining the etch control structures as a function of time the degree and rate of undercut may be precisely determined. Note that once beam 36 tilts, it provides no further useful information because the etching of the cusp of spacer 24 supporting beam 36 is only being etched from one side. Therefore, the additional time required to bring beam 36 back to bright appearance is not indicative of the undercut rate for the flaps in the SLM chips. The critical width for a dropout beam (the width that makes the beam tilt just as the spacer is totally cleared from under the flap; see FIG. 4G) is empirically determined; simple geometry does not apply because the plasma etch undercut rate depends on the area of exposed spacer material. Beams with a distribution of widths about this critical width are chosen for convenience in monitoring the progress of the plasma etch.

Pixel 20 could also have been formed with flap 28 of different shapes but using the same processing. FIGS. 7A–E illustrate various alternatives in plan view. Of course, the number of plasma etch access holes will depend upon the size of the flap or diving board and the depth of the underlying well. Flaps bend primarily at the hinge point, whereas diving boards bend along the entire beam. Because flaps are bent at nearly a constant angle, they have a greater diffraction efficiency than comparably sized diving boards. The flap hinge may be at the corner or along a side; a corner flap hinge will bend in a direction that is rotated 45 degrees with respect to the plasma etch access gaps that define the perimeter of the flap. With this geometry, 45 degree schlieren stop or 45 degree dark field discrimination can be used to produce a high contrast projected image of the deflected flap. In this discrimination technique an optical stop is designed which blocks all of the on-axis diffracted light from the flap perimeter openings (plasma etch access gap), but passes the off-axis light from the 45 degree flap deflection. The plasma etch access holes diffract light nearly isotropically, so some of this light passes around a schlieren stop. However, the resultant degradation is negligible because each hole diffracts only a small portion of the total light energy impinging on each pixel and only a small fraction of that energy is passed by the stop.

The deflection sensitivity of flaps may be increased by extending the hinge region, as shown in two of the alternatives illustrated in FIGS. 7A-E.

Many variations of pixel 20 can be fabricated by essentially the same process. For example, FIG. 8A is a cross sectional elevation of pixel 40 which includes conducting substrate 42, spacer 44 which may be insulating or conducting, dielectric layer 46, and refecting metal layer 48; flap 50 is formed in layers 46 and 48 analogous to flap 20 in layer 26 and has plasma etch access holes 52 and hinge 54. The only constraint is that spacer 44 must be etchable by a plasma that does not etch substrate 42 or dielectric 46; metal 48 may be deposited after plasma etch removal of spacer 44 to form the well beneath flap 50, but this will leave deposits 56 of metal at the bottom of the well as illustrated in FIG. 8A. However, the metal deposits 56 are tolerable and deposition of metal 48 as a last processing step can guarantee a very clean, stress free surface. This allows use of pure aluminum and consequently a very high reflectivity. If spacer 44 can be etched without also etching metal 48, then dielectric 46 and metal 48 can both be deposited and patterned together prior to the removal of spacer 44. This avoids metal deposits 56. Also, if substrate 42 is etched by the plasma etch used to remove spacer 44, then an etch stop layer can be formed on substrate 42 prior to forming the layer of spacer 44 and the same processing steps can be used. The etch stop layer may be insulating; for example, the etch stop layer and dielectric layer 46 may both be silicon dioxide and spacer 44 may be polysilicon.

Note that the composite flap (metal on dielectric) of pixel 40 is subject to charging effects at the dielectric-/air interface due to the intense electric fields which exist across the well. To avoid such charging effects, the electrtic field across the well must be periodically reversed by placing the address signal on an AC carrier. This technique has no significant drawback for a linear array of pixels, but in an area array of pixels with active switching elements at each pixel site, AC addressing is a significant complication and such metal/dielectric composite flaps should be avoided. Similar considerations apply to diving boards and to the use of an insulating etch stop layer on substrate 42.

Figure 9:
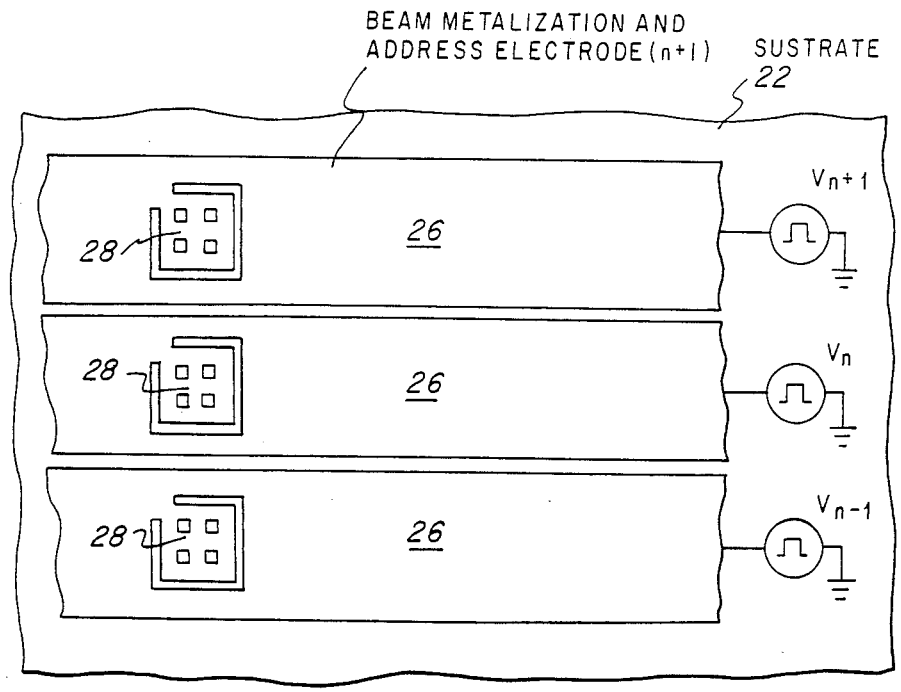
FIG. 9 is a schematic plan view of three adjacent pixels in a linear array SLM.
Figure 11A:
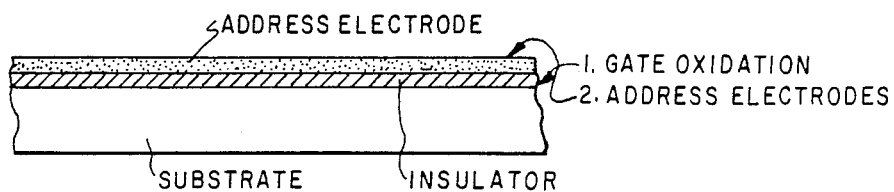
FIGS. 11A-E is a schematic sequence of cross sectional elevations illustrating the steps of a second preferred embodiment method.
Figure 11B:
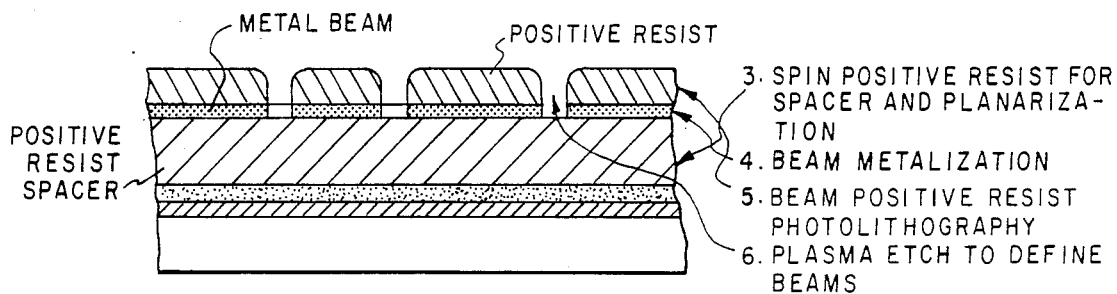
Figure 11C:
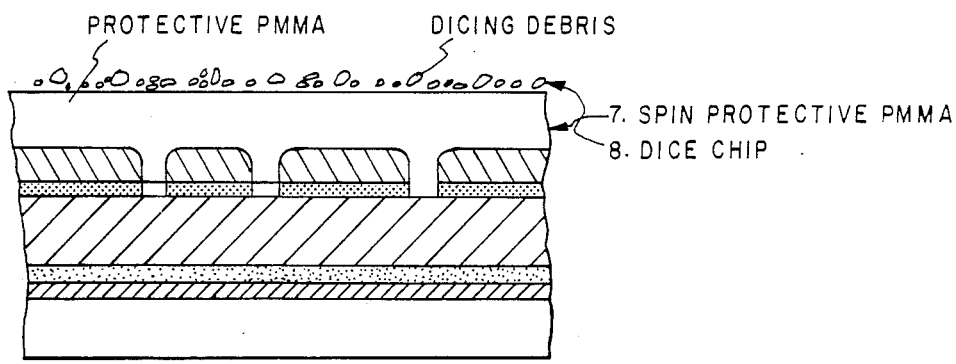
Figure 11D:
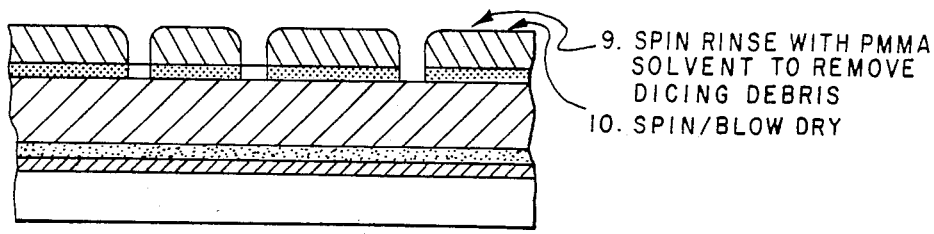
Figure 11E:
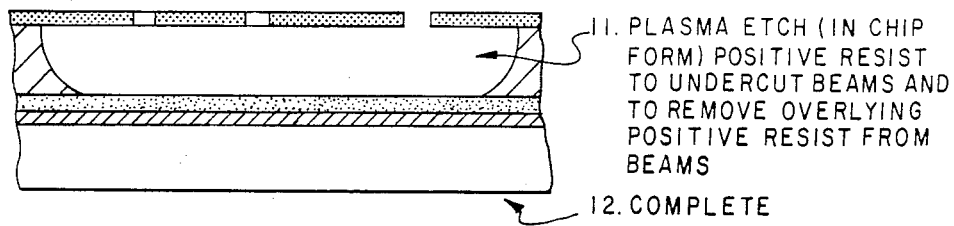

Pixels 20 and 40 implicitly require signals (addressing) be applied to the beams (flaps or diving boards) because the substrate is conducting and common to all pixels in the SLM. Each beam is connected to an electrode formed by patterning layers 26 and 48, and this patterning can be done in the same step as the patterning of layers 26 and 48 to form the plasma etch access holes and gaps. See FIG. 9 for a plan view of a few adjacent pixels with connecting electrodes. Of course, this means that the electrodes are also undercut during the spacer removal plasma etch. If the electrodes are formed by patterning layers 26 and 48 after the plasma etch forming the wells under the beams, then severe loss of yield due to broken beams can be expected. However, as previously discussed with pixel 40, dielectric layer 46 can be patterned for both the plasma etch access holes and gaps and the electrodes, the plasma etch removal of spacer 44 to form the wells done, and then metal 48 deposited. Because of the undercutting of the dielectric during the plasma etch, the deposited metal will not form shorted electrodes but, rather, will leave deposits on the substrate between the electrodes as shown in FIG. 8B. Such beam addressing is feasible for SLMs with linear arrays of pixels, but not for SLMs with area arrays because too much of the area of the SLM would be devoted to electrodes and too little to pixels. Further, the gaps between the electrodes (see FIG. 9) diffract incident light (which cannot be totally focussed on the pixels) and due to the large linear dimensions of these gaps plus the flare of the lenses in the optical system, even a schlieren stop will not totally prevent this diffracted light from appearing as fixed pattern noise in the SLM output.

Second preferred embodiment pixel 60 is illustrated in cross sectional elevation in FIG. 10A and provides substrate addressing of the beam; that is, the beams in an array of pixels are all electrically inter connected and the signal electrodes are located at the bottoms of the wells under the flaps. This can eliminate the diffraction caused by the electrode gaps discussed in connection with FIG. 9. Pixel 60 includes silicon substrate 62, insulating layer 64, electrode layer 66, spacer 68, and reflecting layer 70 in which flap 72 has been formed with plasma etch access holes 74 and hinge 76. Insulating layer 64 may be silicon dioxide grown on substrate 62; electrode layer may be patterned polysilicon deposited by LPCVD; spacer may be spun on positive phototresist; and reflecting layer may be aluminum alloyed with four percent copper and sputter deposited on spacer layer 68. The fabrication steps (llustrated in FIG. 11) for pixel 60 are analogous to those of pixel 20 and are as follows: a thermal oxide layer about 2,000 Å thick is grown on a <100> oriented substrate; polysilicon is deposited to a thickness of 3,000 Å and doped with phosphorus to a sheet resistance of approximately 50 ohms per square; the polysilicon is plasma etched with the electrode pattern; positive photoresist is then spun on and bakes in three applications to a total thickness of about 2.4 microns; three applications of resist are used to build up the thcikness in order to avoid resist surface waves which can occur when spinning a single very thick layer; a bake to approximately 180 degrees C. is required between each application to prevent the previous layers from dissolving in the resist solvent; a 180 degrees C. bake is also required after the last layer to drive excess solvent out of the spacer; this final bake avoids the formation of solvent bubbles under the beam metal during the photoresist bake for the beam pattern photolighography; approximately 1,200 Å of 4% Cu:Al alloy is then sputter deposited at a substrate temperature as near to room temperature as possible; in general, organic spacers have a higher coefficient of expansion than aluminum so when the wafer cools from the sputtering temperature, the beam metal is put under compression, leading to buckling of the beam at its hinge point (note that this thermally induced extrinsic compression is in addition to any intrinsic compression arising from the deposition process itself); positive resist is preferable to PMMA as the spacer material because it has a coefficient of expansion closer to that of aluminum; the copper-aluminum alloy is chosen for its resistance to the formation of hillocks during the photolithography bake and its low susceptibility to fatigue after prolonged beam operation; positive resist is spun on the beam metal and exposed and developed in the beam pattern; the beam metal is plasma etched (chlorine plus recombinants to etch aluminum) to form the plasma etch access holes and gaps, the resist to define and pattern the beam metal is left on the wafer; a protective layer of PMMA approximately 1.5 microns thick is spun on and the chips are diced with a diamond saw; each chip is put on a spinner and the PMMA solvent is flooded onto the surface while the spinner is periodically pulsed from low spin speeds (100 rpm) to high spin speed (8,000 rpm); this pulsing action has the advantage of improved removal of dicing debris, during the low spin speed portion of the cycle a layer of PMMA is softened and then the spin speed is suddenly increased to the high spin speed which causes the softened layer and imbedded dicing debris to be sloughed off by the high centrifugal force; repeating the spin cylce until all of the PMMA is removed guarantees a surface free of dicing debris which could lodge in the plasma etch access holes and gaps and affect the plasma etch rate in a vicinity; and the chips are plasma etched on the temperature controlled cathode of a planar plasma etcher in oxygen, the temperature is controlled in the range of 60 to 100 degrees C., above 100 degrees C. the spacer can soften and produce stress relief and upon cooling the beam metal is then put into compression, below 60 degrees C. the undercut rate is severely reduced, the power density and pressure are chosen to produce isotropic etching of the spacer to minimize the undercut time, the overlying positive resist layer is etched away during the initial stages of the beam undercut. The result is a clean, undercut chip with no mechanical beam breakage and a beam metal which is under tension.

The operation of pixel 60 is analogous to that of pixel 20, but with the signal applied to electrode 66 at the bottom of the well and with flap 72 and substrate 62 both grounded or DC biased. Again, the induced charges on the plates of the air gap capacitor formed by flap 72 and electrode 66 exert an electrostatic force which deflects flap 72 and is opposed by the restoring force generated by the bending of hinge 76.

Variations of pixel 60 are numerous and immediate and include the following:

(a) The geometry of the beam may be flaps or diving boards, as illustrated in FIG. 7 Of course, the number and location of the plasma etch access holes (if any) depends on the size of the beam, the depth of the well, and the tolerance to undercut away from the beam.

(b) The beam may be a composite of metal on insulator (for example, pixel 40 and asociated discussion) or a composite of two metals, such as aluminum on refractory (the aluminum is for reflectivity and the refractory is for high yield stress); note that the aluminum may be deposited after the refractory metal has been patterned and the plasma etch done because deposition of aluminum at the bottom of the wells (see FIG. 8 and discussion) is tolerable and avoids patterning of the aluminum which, in turn, avoids hillock growth or other stress relief effects that might occur during photoresist bakes.

(c) Spacer 68 may be any spun on insulator, such as PMMA. Spacer 68 also may be a conformally deposited insulator, such as silicon nitride, if address electrode 66 is planarized, such as can be had by use of polysilicon for electrode 66 with thermal oxide grown (LOCOS or SWAMI techniques suffice) between the electrodes for isolation and to the same elevation as electrode 66.

(d) Electrode 66 may be an n+ diffusion in substrate 62 which is p-type silicon; the junction will be reversed biased for isolation of the electrodes, and the insulator layer 64 can be omitted if an insulating spacer 68 is used.

(e) Spacer 68 may be a conductor, such as polysilicon, if an insulating layer is formed either between spacer 68 and reflecting layer 70 (such as with the composite beam of metal on insulator of (b) or pixel 40) or between spacer 68 and electrode 66. For example, with the diffused electrode of (d), a planarizing oxide 78 (LOCOS process) could be formed prior to the deposition of spacer 68; see FIG. 10B.

(f) Transistors for switching of electrode 66 could be formed under conducting spacer 68 in a variety of ways. For example, in FIG. 10B electrode 66 could have been formed in two parts, shown by the dotted lines in the left hand portion of the figure, to form a drain and source of a field effect transistor with oxide 78 being the gate oxide and spacer 68 including the gate.

Many of the foregoing modifications also immediately apply to pixels 20 and 40.

Figure 12A:
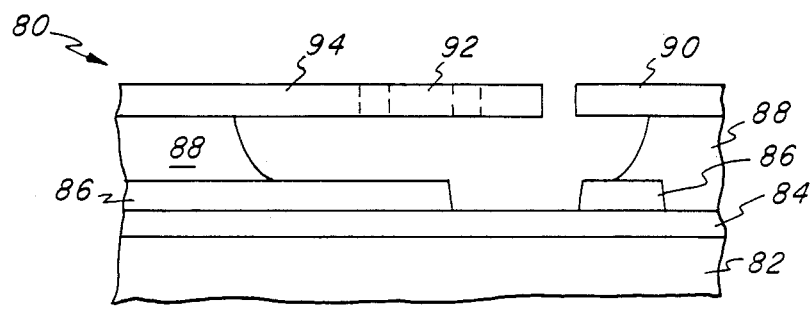
FIGS. 12A-B are schematic cross sectional and plan views of a pixel fabricated by a third preferred embodiment method.
Figure 12B:
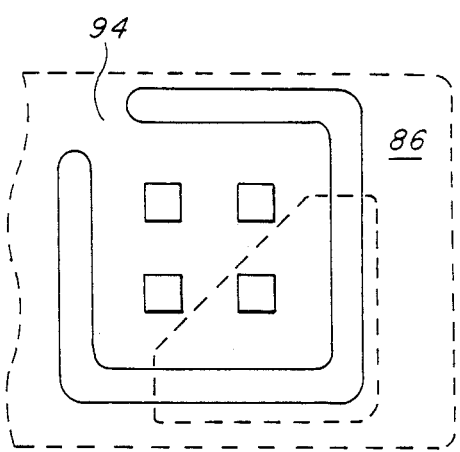

Third preferred embodiment pixel, generally denoted 80, is shown in cross sectional elevation and plan views in FIGS. 12A and B, respectively. Pixel 80 includes substrate 82, insulating layer 84, electrode 86, spacer 88, and reflecting layer 90 with flap 92 and hinge 94 formed therein. Electrode 86 is shown in dotted lines in FIG. 12B and has a triangular hole underneath the portion of flap 92 farthest from hinge 94. This hole in electrode 86 permits larger deflection of flap 92 before instability and collapse occur because the induced charges exerting the attractive force are now located closer to the center of flap 92 and thus the force varies less rapidly as a function of the deflection than with the charge at the corner farthest from the hinge. A diving board beam model developed by K. Petersen (Dynamic Micromechanics on Silicon:Techniques and Devices, 25 IEEE Tran. Elec.Dev. 1241 (1978)) suggests that with a uniform load the maximum stable deflection is about 44 percent of the well depth (spacer thickness) regardless of beam length. Thus by use of an electrode with a hole below the free end of the beam, the effective length of the beam for application of the model is only a fraction of the beam length, and the endpoint of this effective length may stably deflect to 44 percent of well depth which implies that the beam endpoint deflects much more.

Figure 13A:
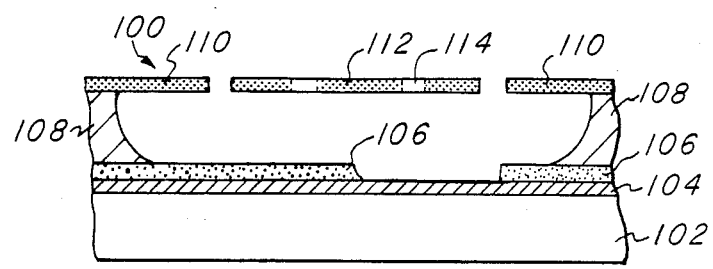
FIGS. 13A-B are schematic cross sectional and plan views of a pixel fabricated by a fourth preferred embodiment method.
Figure 13B:
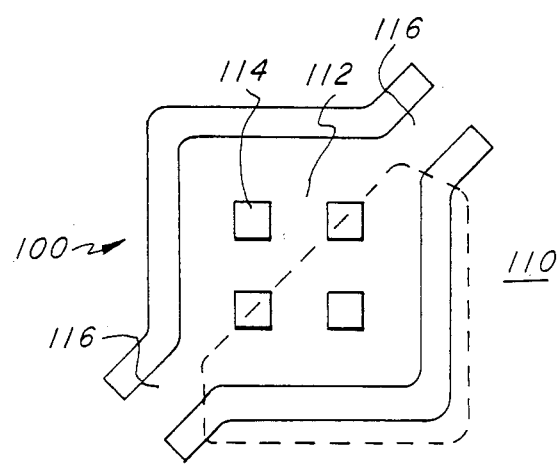

Fourth preferred embodiment pixel 100 is illustrated in cross sectional and plan views in FIGS. 13A and B, respectively. Pixel 100 includes substrate 102, insulating layer 104, electrode 106 which has a triangular hole shown in dotted lines in FIG. 13B, spacer 10B, and reflective layer 110 in which torsion flap 112 with plasma etch access holes 114 and torsion hinges 116 has been formed. Pixel 100 is fabricated by process steps similar to those used to fabricate pixel 80. Pixel 100 operates by twisting flap 112 along the axis through the two torsion hinges 116; the twisting torque arises from a signal applied to electrode 106 which only attracts the lefthand portion of flap 112 as viewed in FIG. 13A because of the hole in electrode 106. Note that FIG. 13A is a view along the axis of twist, and that the twist is counterclockwise. The torsion hinge compliance may be adjusted by varying the length to width ratio of torsion hinges 116 and the thickness of reflecting layer 110.

Pixel 100 deflects at a 45 degree angle relative to the plasma etch access gap defining the perimeter of flap 112 and, as discussed above, this permits use of 45 degree schlieren stop or 45 degree dark field discrimination in the optical processing of the light reflected by an SLM composed of pixels similar to pixel 100. Pixel 100 also provides more efficient diffraction than a bending hinge beam simply because flap 112 deflects both above and below the reflecting layer 110 and thereby has a greater stable deflection angle than a flap of the same size; recall that the maximum stable deflection is determined by how close a corner of the flap approaches the electrode and that this is 44 percent of the well depth for the diving board model discussed in connection with pixel 80. Lastly, pixel 100 has flap 112 attached at both ends so rotation about the twist axis is unaffected by a stress gradient or compression in reflecting layer 110. Consequently, pixel 100 can operate under a wider range of layer 110 deposition conditions than for the cantilever beam pixels.

Figure 14A:
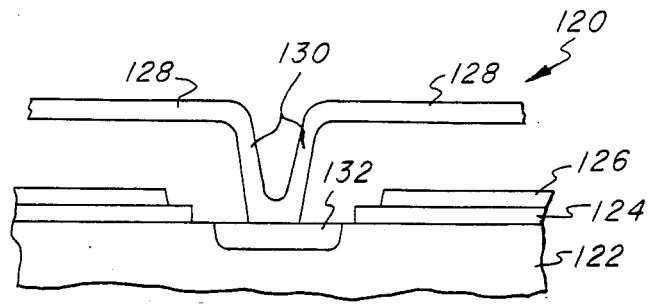
FIGS. 14A-B are schematic cross sectional and plan views of a pixel fabricated by a fifth preferred embodiment method.
Figure 14B:
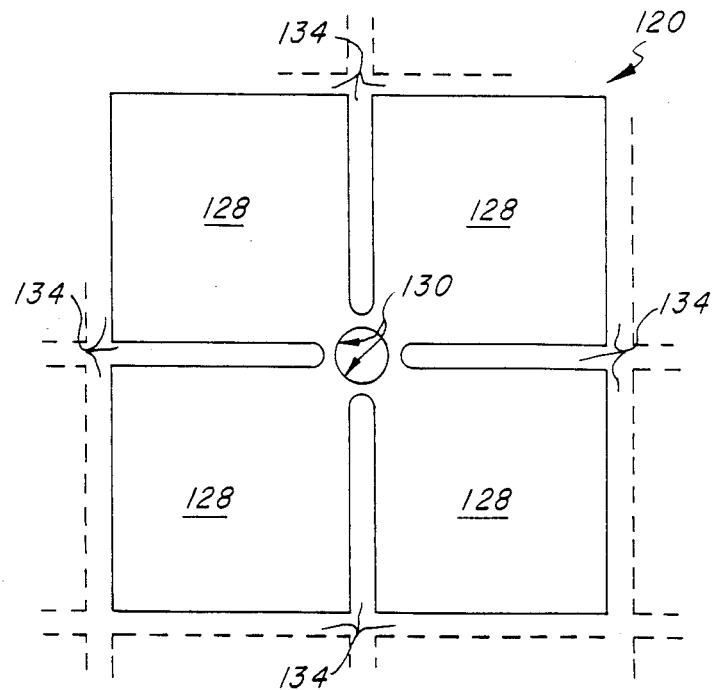

Fifth preferred embodiment pixel 120 is shown in cross sectional and plan views in FIGS. 14A and B, respectively. Pixel 120 includes substrate 122, insulating layer 124, field plate 126, flaps 128, support post 130, and flap addressing electrode diffusion 132. Support post 130 is cylindrical and supports four flaps symmetrically, as shown in FIG. 14B. Flaps 128 and support post 130 are made of aluminum alloyed with 4 percent copper, and application of a signal voltage between flaps 128 (via diffusion 132) and field plate 126 bends the flaps analogous to the operation of pixels 20, 40, 60, 80, and 100. Pixel 120 allows for a very tight packing of pixels in an SLM because no spacer is required for support; rather, the use of support post 130 eliminates the need for spacer in the final product. Adjacent pixels are indicated by the dotted lines in FIG. 14B.

Pixel 120 is fabricated by essentially the same process steps previously described; after diffusion 132, insulating layer 124, and field plate 126 are formed, a spacer is spun on, but this spacer is then patterned to open up holes for support post 130 form as part of the deposition of the metal. As before, plasma etch access gaps 134 are photolithographically defined in the metal, the wafer diced and cleaned up, and lastly the spacer is then plasma etched completely away to finish the processing. Since the spacer is completely removed, no plasma etch access holes are required and monitoring the progress of the etching by dropout beams is unnecessary.

Variations of the foregoing with respect to dimensions, materials, doping levels, plasma reactor levels, architectures, and so forth are immediate.

I claim:

1. A method of fabrication of spatial light modulators, comprising the steps of:
   (a) form electrical addressing circuitry on a substrate;
   (b) deposit a spacer layer on said substrate and over said circuitry;
   (c) deposit a reflecting layer on said spacer layer;
   (d) pattern said reflecting layer to define a plurality of pixel elements connected to the remainder of said reflecting layer; and
   (e) plasma etch said spacer layer to form wells under said pixel elements, thereby freeing said pixel elements from said spacer layer and permitting them to be electrostatically deflected by signals on said addressing circuitry.

2. A method of fabrication of spatial light modulators, comprising the steps of:
   (a) deposit a spacer layer on a conducting substrate;
   (b) deposit a reflecting layer on said spacer layer;
   (c) pattern said reflecting layer to define a plurality of pixel elements and electrodes; and
   (d) plasma etch said spacer layer to form walls under said pixel elements, thereby freeing said pixel elements from said spacer layer and permitting them to be electrostatically deflected by signals applied between said electrodes and said substrate.

3. A method of fabrication of spatial light modulators, comprising the steps of:
   (a) depositing a spacer on a substrate with electrical addressing circuitry;
   (b) pattern post holes in said spacer extending down to said substrate;
   (c) deposit a layer of metal on said spacer and post holes;
   (d) pattern said layer of metal to define deflectable elements, each of said elements hinged to the metal deposited in one of said post holes; and
   (e) remove said spacer.

4. The method of claim 3, wherein said removal is by plasma etching.

5. A method of fabrication of spatial light modulators, comprising the steps of:
   (a) defining deflectable beams and supporting structure in a combination of layers of reflecting material and spacer, said reflecting material on said spacer on a substrate;
   (b) applying a protective layer over said defined beams;
   (c) dicing said substrate and layers into chips, each of said chips to become a spatial light modulator;
   (d) alternately applying a solvent for said protective layer and spinning said chips to slough off portions of said protective layer softened or dissolved in said solvent;
   (e) removing at least a portion of said spacer to free said deflectable beams from said spacer.

6. A method of monitoring the undercut of a plasma etch of a spacer between a substrate and a top layer, comprising the steps of:
   (a) patterning substantially rectangular regions in said top layer, said rectangular regions with a progression of known widths;
   (b) periodically observing said regions under light;
   (c) determining the undercut to be about one half of the width of the widest rectangular region to have changed its reflectance of said light.

* * * * *